United States Patent
Nishibayashi et al.

(10) Patent No.: US 12,327,683 B2
(45) Date of Patent: Jun. 10, 2025

(54) THREE-TERMINAL MULTILAYER CERAMIC CAPACITOR

(71) Applicant: Murata Manufacturing Co., Ltd., Nagaokakyo (JP)

(72) Inventors: Kazuhiro Nishibayashi, Nagaokakyo (JP); Satoshi Ishitobi, Nagaokakyo (JP); Takashi Sawada, Nagaokakyo (JP); Yuko Kawasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 75 days.

(21) Appl. No.: 18/070,512

(22) Filed: Nov. 29, 2022

(65) Prior Publication Data
US 2023/0238183 A1    Jul. 27, 2023

(30) Foreign Application Priority Data
Jan. 27, 2022   (JP) .................... 2022-010957

(51) Int. Cl.
| | |
|---|---|
| H01G 4/008 | (2006.01) |
| H01G 4/012 | (2006.01) |
| H01G 4/232 | (2006.01) |
| H01G 4/30 | (2006.01) |

(52) U.S. Cl.
CPC .......... *H01G 4/0085* (2013.01); *H01G 4/012* (2013.01); *H01G 4/232* (2013.01); *H01G 4/30* (2013.01)

(58) Field of Classification Search
USPC ...................................... 361/303
See application file for complete search history.

(56) References Cited

U.S. PATENT DOCUMENTS

| | | | | |
|---|---|---|---|---|
| 5,097,391 | A * | 3/1992 | Nomura ............... | H01G 4/1281 29/25.42 |
| 5,910,881 | A * | 6/1999 | Ueno ...................... | H01G 4/30 361/321.5 |
| 6,442,813 | B1 * | 9/2002 | Sakamoto .............. | H01G 4/30 29/25.42 |
| 2003/0011962 | A1 * | 1/2003 | Yamamoto ............ | H01G 4/30 361/321.2 |
| 2008/0128860 | A1 * | 6/2008 | Sawada ................. | H01G 4/232 257/E27.047 |
| 2010/0328844 | A1 * | 12/2010 | Nishimura ............ | C04B 35/462 361/321.5 |
| 2013/0063862 | A1 * | 3/2013 | Kim ....................... | H01G 4/30 156/182 |
| 2015/0318111 | A1 * | 11/2015 | Lee ...................... | H01G 4/2325 29/25.03 |

(Continued)

FOREIGN PATENT DOCUMENTS

| | | | | |
|---|---|---|---|---|
| JP | 03208323 | A | * | 9/1991 |
| JP | 2001-155952 | A | | 6/2001 |

(Continued)

*Primary Examiner* — Eric W Thomas
(74) *Attorney, Agent, or Firm* — Keating & Bennett, LLP

(57) ABSTRACT

A three-terminal multilayer ceramic capacitor includes at least one surface electrode layer on a surface of a second internal electrode layer connected to a lateral surface external electrode. The surface electrode layer includes at least one of Sn, In, Ga, Zn, Bi, Pb, Fe, V, Y or Cu, which is different from a main component of the second internal electrode layer.

20 Claims, 3 Drawing Sheets

(56) References Cited

U.S. PATENT DOCUMENTS

2016/0035491 A1* 2/2016 Park .................... H01G 4/232
                                                                      361/301.4
2020/0058444 A1* 2/2020 Cha ..................... H01G 4/12
2020/0312564 A1* 10/2020 Onishi ................. H01G 4/232

FOREIGN PATENT DOCUMENTS

JP        2012164744 A  *  8/2012
WO    WO-2012120913 A1 *  9/2012   ........... H01G 4/0085

\* cited by examiner

THREE-TERMINAL MULTILAYER CERAMIC CAPACITOR

CROSS REFERENCE TO RELATED APPLICATIONS

This application is based on and claims the benefit of priority from Japanese Patent Application No. 2022-010957 filed on Jan. 27, 2022, the entire contents of which are hereby incorporated herein by reference.

BACKGROUND OF THE INVENTION

1. Field of the Invention

The present invention relates to a chip-shaped three-terminal multilayer ceramic capacitor including, on an outer surface of a component body, two end surface external electrodes defining and functioning as input-output terminals, and lateral surface external electrodes defining and functioning as ground terminals.

2. Description of the Related Art

Three-terminal multilayer ceramic capacitors have extremely low residual inductance (ESL) and series equivalent resistance (ESR), and are particularly excellent in impedance characteristics at high frequencies. Therefore, the three-terminal multilayer ceramic capacitors are widely used in digital circuits such as digital home appliances, computers, and car electronics.

In recent years, with the development of electronics technology, multilayer ceramic capacitors are required to be reduced in size and increased in capacity, and thus reductions in thickness of the dielectric layers and the internal electrode layers of a multilayer body have been investigated.

However, as the dielectric layers are thinned, the electric field intensity applied per layer becomes relatively high.

Furthermore, as the internal electrode layers are thinned, it becomes difficult to form continuous uniform layers in the manufacturing process.

Therefore, in the reduction in size of the multilayer ceramic capacitor, these factors introduce a risk of a decrease in capacitance and it is difficult to maintain the dielectric breakdown strength and high-temperature load life, a result of which it tends to be difficult to obtain capacitors with high reliability.

For this reason, there is a demand for the development of three-terminal multilayer ceramic capacitors having favorable dielectric properties and excellent reliability without dielectric breakdown, etc., occurring even when the dielectric layers and the internal electrode layers are reduced in thickness to reduce the size.

SUMMARY OF THE INVENTION

Preferred embodiments of the present invention provide three-terminal multilayer ceramic capacitors, each achieving favorable dielectric properties and excellent reliability without dielectric breakdown, etc., occurring even when dielectric layers and internal electrode layers are reduced in thickness to reduce the size.

As a result of investigation by the inventors of preferred embodiments of the present invention to address the above-described problems, the inventors of preferred embodiments of the present invention have discovered that, with a three-terminal multilayer ceramic capacitor including a surface electrode layer including any one of elements including Sn, In, Ga, Zn, Bi, Pb, Fe, V, Y, or Cu, which is different from the main component of the base material, on a surface of the base material of a second internal electrode layer connected to a lateral surface external electrode, favorable dielectric characteristics and excellent reliability can be obtained even when a voltage with a high electric field intensity is applied.

A preferred embodiment of the present invention provides a three-terminal multilayer ceramic capacitor including a multilayer body including an inner layer portion in which a plurality of dielectric layers and a plurality of internal electrode layers are laminated alternately, and outer layer portions on both sides of the inner layer portion in a lamination direction, end surface external electrodes respectively on a first end surface and a second end surface in a length direction intersecting the lamination direction of the multilayer body, and at least one lateral surface external electrode on at least one side in a width direction intersecting the lamination direction and the length direction of the multilayer body, wherein the plurality of internal electrode layers include first internal electrode layers that each penetrate the multilayer body in the length direction and connect to the end surface external electrodes, and second internal electrode layers that each generate capacitance with the first internal electrode layer and connect to the lateral surface external electrode, and at least one surface electrode layer is provided on a surface of the second internal electrode layer, and the surface electrode layer includes at least one of Sn, In, Ga, Zn, Bi, Pb, Fe, V, Y or Cu, which is different from a main component of the second internal electrode layer.

In a three-terminal multilayer ceramic capacitor according to a preferred embodiment of the present invention, the first internal electrode layers and the second internal electrode layers each include Ni or Cu.

In a three-terminal multilayer ceramic capacitor according to a preferred embodiment of the present invention, the first internal electrode layers and the second internal electrode layers each have a thickness in the lamination direction of about 0.1 μm or more and about 2.0 μm or less.

In a three-terminal multilayer ceramic capacitor according to a preferred embodiment of the present invention, the first internal electrode layers and the second internal electrode layers each have a thickness in the lamination direction of about 0.2 μm or more and about 0.4 μm or less.

In a three-terminal multilayer ceramic capacitor according to a preferred embodiment of the present invention, the internal electrode layers include the first internal electrode layers and the second internal electrode layers provided alternately.

In a three-terminal multilayer ceramic capacitor according to a preferred embodiment of the present invention, the internal electrode layers include the first internal electrode layers that are consecutively provided in a predetermined region.

In a three-terminal multilayer ceramic capacitor according to a preferred embodiment of the present invention, a second internal electrode layer is provided as a lowest layer of the internal electrode layers.

In a three-terminal multilayer ceramic capacitor according to a preferred embodiment of the present invention, the surface electrode layer includes Ni as a main component and at least one of Sn, In, Ga, Zn, Bi, Pb, Fe, V, Y, or Cu as a subcomponent in a proportion of about 40 mol or more and about 80 mol or less with respect to 100 mol of the main component.

In a three-terminal multilayer ceramic capacitor according to a preferred embodiment of the present invention, the surface electrode layer has a thickness in the lamination direction of about 5 nm or more and about 40 nm or less.

In a three-terminal multilayer ceramic capacitor according to a preferred embodiment of the present invention, the dielectric layers each include Ba, Ti, at least one of Mg, B or Mo, and at least one of Dy, Ho, or Tb.

In a three-terminal multilayer ceramic capacitor according to a preferred embodiment of the present invention, the dielectric layers each include a thickness in the lamination direction of about 0.2 μm or more and about 2.0 μm or less.

In a three-terminal multilayer ceramic capacitor according to a preferred embodiment of the present invention, the dielectric layers each include a thickness in the lamination direction of about 0.2 μm or more and about 0.4 μm or less.

In a three-terminal multilayer ceramic capacitor according to a preferred embodiment of the present invention, the end surface external electrodes and the lateral surface external electrode respectively include Ni and a dielectric.

In a three-terminal multilayer ceramic capacitor, the end surface external electrodes and the lateral surface external electrode respectively include Cu and Si.

According to preferred embodiments of the present invention, it is possible to provide three-terminal multilayer ceramic capacitors each achieving favorable dielectric characteristics and excellent reliability without dielectric breakdown, etc., occurring even when the dielectric layers and the internal electrode layers are reduced in thickness to reduce the size.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, three-terminal multilayer ceramic capacitors 1 according to preferred embodiments of the present invention will be described.

Figure 1:
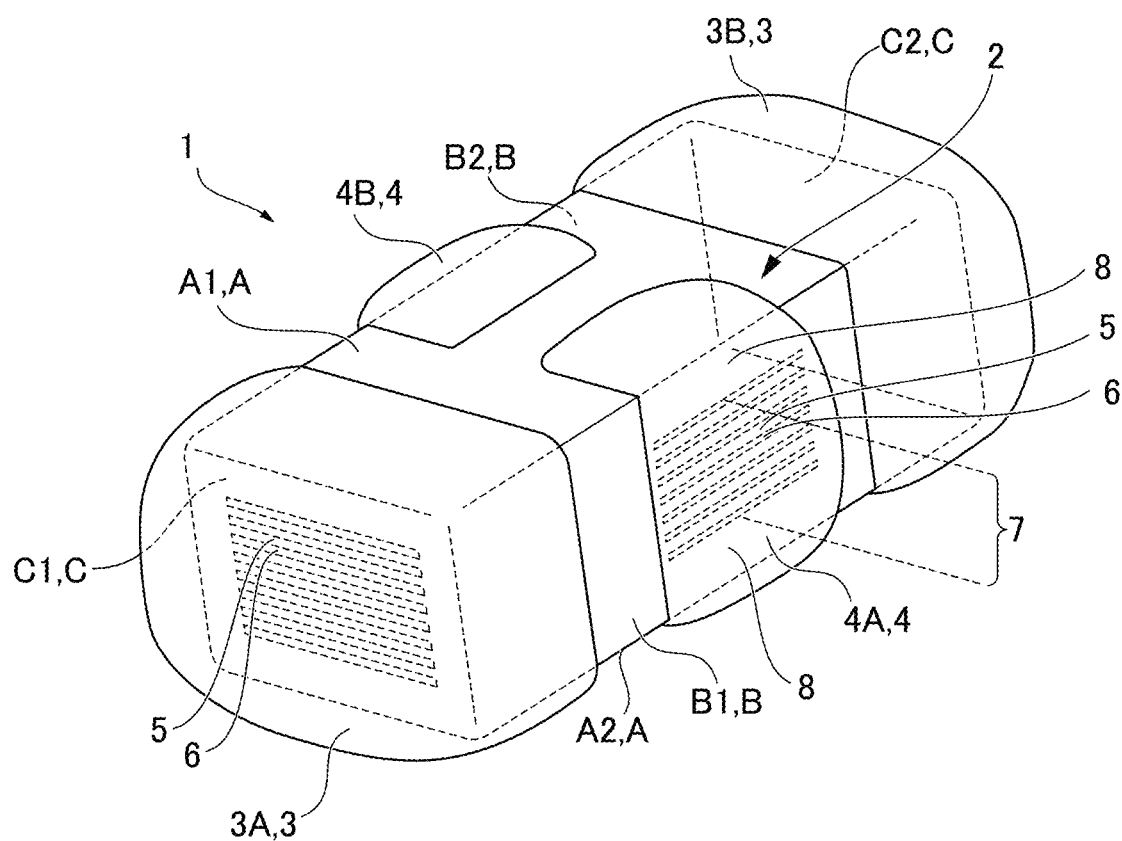
FIG. 1 is an external view (partially transparent view) of a three-terminal multilayer ceramic capacitor according to a preferred embodiment of the present invention.
Figure 1:
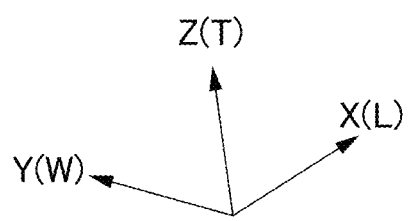

FIG. 1 is an external view (partially transparent view) of a multilayer ceramic capacitor 1 according to a preferred embodiment of the present invention.

Figure 2:
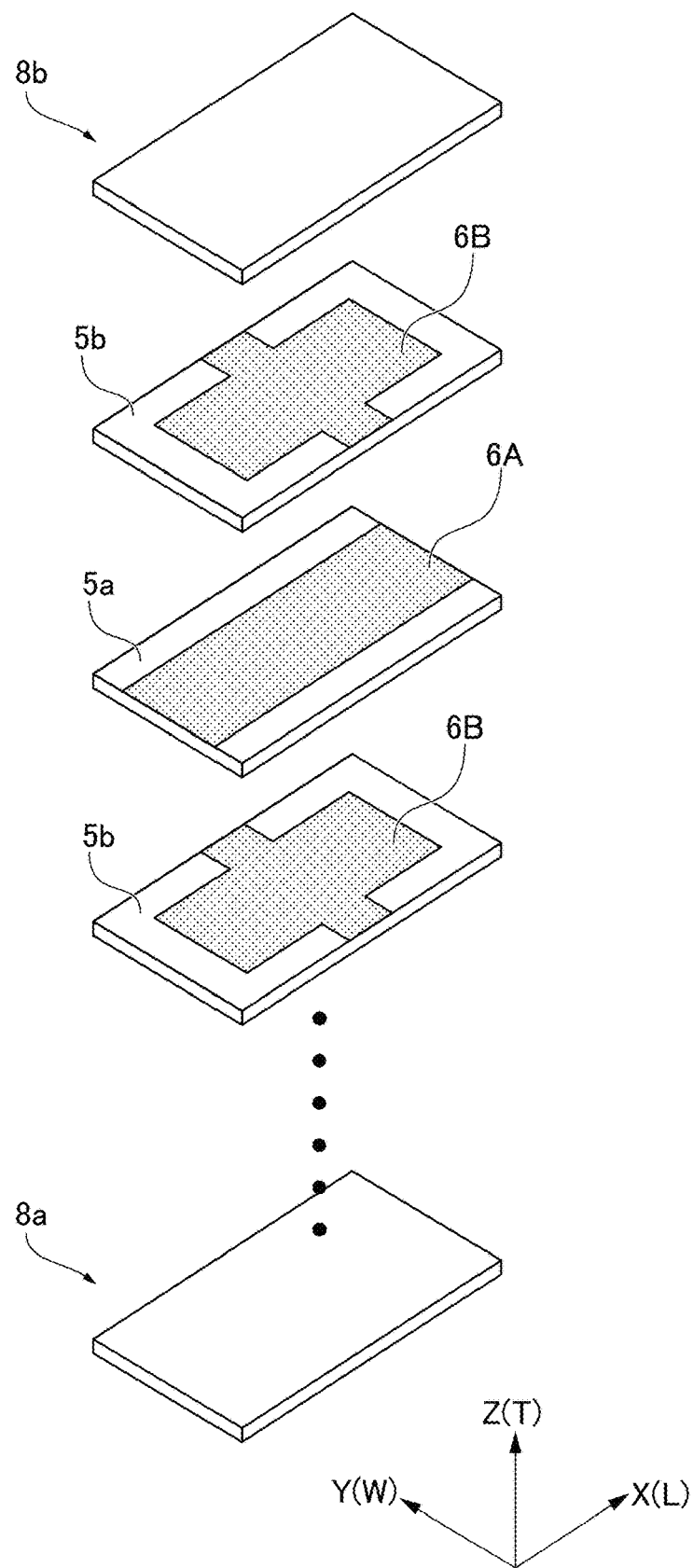
FIG. 2 is a conceptual diagram showing a structure of a multilayer body according to a preferred embodiment of the present invention.

FIG. 2 is a conceptual diagram showing a structure of a multilayer body of the three-terminal multilayer ceramic capacitor 1 shown in FIG. 1.

Figure 3:
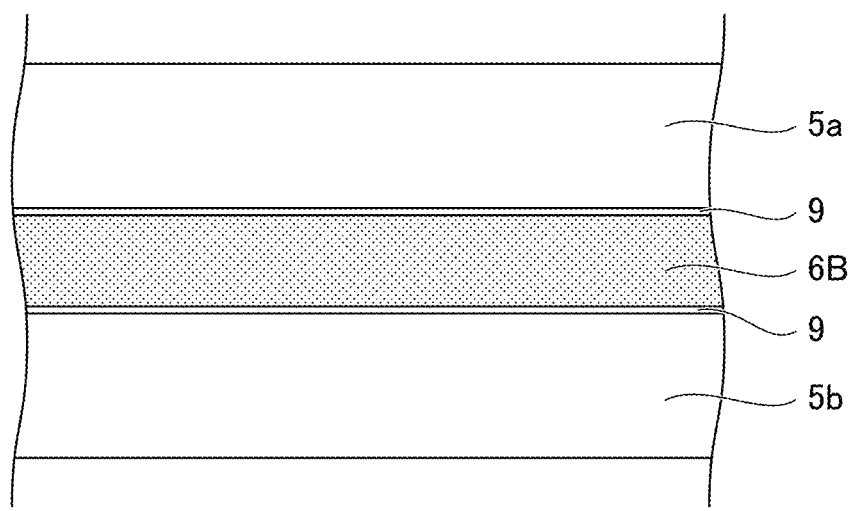
FIG. 3 is a conceptual view (cross-sectional view) showing a state of a surface electrode layer according to a preferred embodiment of the present invention.

FIG. 3 is a conceptual view (cross-sectional view) showing a state of a surface electrode layer 9 according to a preferred embodiment of the present invention.

Three-Terminal Multilayer Ceramic Capacitor

The three-terminal multilayer ceramic capacitor 1 has a rectangular or substantially rectangular parallelepiped shape, and includes a multilayer body 2, a pair of end surface external electrodes 3 provided at both ends of the multilayer body 2, and a lateral surface external electrode 4 provided on at least one lateral surface of the multilayer body.

The multilayer body 2 includes an inner layer portion 7 in which a plurality of dielectric layers 5 and a plurality of internal electrode layers 6 are alternately laminated (stacked).

In the following description, as a term indicating the orientation of the three-terminal multilayer ceramic capacitor 1, a direction in which the pair of end surface external electrodes 3 is provided in the three-terminal multilayer ceramic capacitor 1 is referred to as a length direction L.

A direction in which the dielectric layers 5 and the internal electrode layers 6 are laminated is referred to as a lamination direction T.

A direction intersecting both the length direction L and the lamination direction T is referred to as a width direction W.

FIG. 1 shows an XYZ orthogonal coordinate system.

In a preferred embodiment of the present invention, the width direction W is orthogonal or substantially orthogonal to both the length direction L and the lamination direction T. However, these directions are not necessarily orthogonal or substantially orthogonal to one another, and may intersect with one another.

Among the six outer surfaces of the multilayer body 2, a pair of outer surfaces opposed to each other in the lamination direction T are defined as a first main surface A1 and a second main surface A2, a pair of outer surfaces opposed to each other in the width direction W are defined as a first lateral surface B1 and a second lateral surface B2, and a pair of outer surfaces opposed to each other in the length direction L are defined as a first end surface C1 and a second end surface C2.

In addition, the multilayer ceramic capacitor 1 according to the present preferred embodiment is often used with the second main surface A2 located adjacent to the mounting side and the first main surface A1 located adjacent to the opposite side.

The first main surface A1 and the second main surface A2 are collectively referred to as a main surface A when it is not necessary to be particularly distinguished from each other. The first lateral surface B1 and the second lateral surface B2 are collectively referred to as a lateral surface B when it is not necessary to be particularly distinguished from each other. The first end surface C1 and the second end surface C2 are collectively referred to as an end surface C when it is not necessary to be particularly distinguished from each other.

In the three-terminal multilayer ceramic capacitor according to the present preferred embodiment, each element listed as a component to be mixed may be any composition or material, such as, for example, a simple substance, a compound, an alloy, and a solid solution, and a prescribed element thereamong may be mixed at a predetermined portion.

Multilayer Body

The multilayer body 2 includes the inner layer portion 7 and touter layer portions 8 provided in the lamination direction so as to sandwich the inner layer portion 7 and providing the first main surface A1 and the second main surface A2.

Inner Layer Portion

In the inner layer portion 7, the plurality of dielectric layers 5 and the plurality of internal electrode layers 6 are laminated.

The inner layer portion 7 includes, for example, 5 or more and 2000 or less dielectric layers and internal electrode layers, respectively.

Outer Layer Portion

The outer layer portions 8 sandwich the inner layer portion 7 in the lamination direction T, and provide the first main surface A1 and the second main surface A2.

The outer layer portions 8 may each be made of the same ceramic material as the dielectric layer 5 of the inner layer portion 7.

Dielectric Layer

The dielectric layers 5 can each be obtained by sintering a ceramic green sheet in which a slurry is formed in a sheet shape. The slurry is obtained by adding a binder, an additive such as a plasticizer or a dispersant, and an organic solvent to a mixture obtained by adding and mixing a ceramic powder, a glass component, and a sintering aid as necessary.

The ceramic powder may include as a main component, for example, barium titanate ($BaTiO_3$), which is an oxide of Ba and Ti.

A predetermined additive compound may be blended in the main component depending on the purpose.

Examples of the additive compound include oxides including at least one selected from Mg, B, and Mo and at least one selected from Dy, Ho, and Tb.

The thickness of the dielectric layer 5 in the lamination direction T is preferably, for example, about 0.2 μm or more and about 2.0 μm or less, and more preferably about 0.2 μm or more and about 0.4 μm or less.

It is possible to reduce the size of the three-terminal multilayer ceramic capacitor by reducing the thickness thereof while maintaining the capacitance, the dielectric breakdown strength, and the life at high temperature load.

Internal Electrode Layer

The internal electrode layers 6 are each formed by applying an internal electrode paste including a metal powder defining and functioning as an electric conductor, a binder, an additive such as a plasticizer or a dispersant, and an organic solvent on a ceramic green sheet, and then sintering the paste together with the ceramic green sheet.

The internal electrode layers 6 provide the inner layer portions 7 alternately laminated with the dielectric layers 5.

Furthermore, the internal electrode layers 6 include first internal electrode layers 6A and second internal electrode layers 6B.

First Internal Electrode Layer

The first internal electrode layer 6A penetrates the inside of the multilayer body 2 in the length direction L and is connected to the end surface external electrode 3.

The first internal electrode layer 6A has a shape in which both ends of the first internal electrode layer 6A are exposed at the end surface C of the multilayer body and connected to the end surface external electrode 3, but not exposed at the lateral surface B of the multilayer body or not connected to the lateral surface external electrode 4.

In a preferred embodiment of the present invention, the first internal electrode layer 6A has a rectangular or substantially rectangular shape as shown in FIG. 2. However, the present invention is not limited thereto, and any shape may be provided as long as the first internal electrode layer 6A is connected to the end surface external electrode 3, but is not connected to the lateral surface external electrode 4.

Furthermore, the first internal electrode layer 6A is not necessarily a continuous layer. As long as the first internal electrode layer 6A includes a layered portion and can maintain the capacitance, the advantageous effects of the present invention are achievable even if it includes an intermittent portion. Therefore, all of the possible configurations of the first internal electrode layer 6A achieving such advantageous effects are included in the present invention.

Second Internal Electrode Layer

The second internal electrode layer 6B penetrates the inside of the multilayer body 2 in the width direction W, is connected to the lateral surface external electrode 4, and provides an electrostatic capacitance with the first internal electrode layer 6A.

In a preferred embodiment of the present invention, both ends of the second internal electrode layer 6B are exposed at the lateral surface B of the multilayer body and connected to the lateral surface external electrode 4, but not exposed at the end surface C of the multilayer body or not connected to the end surface external electrode 3.

The second internal electrode layer 6B may have a cross shape or a substantially cross shape as shown in FIG. 2. However, the present invention is not limited thereto, and any shape may be provided as long as the second internal electrode layer 6B is connected to the lateral surface external electrode 4, but is not connected to the end surface external electrode 3.

Furthermore, the second internal electrode layer 6B is not necessarily a continuous layer. As long as the first internal electrode layer 6A includes a layered portion and can maintain the capacitance, the advantageous effects of the present invention are achievable even if it includes an intermittent portion. Therefore, all of the possible configurations of the first internal electrode layer 6A achieving such advantageous effects are included in the present invention.

The first internal electrode layer 6A and the second internal electrode layer 6B may each include, for example, Ni or Cu.

When Ni or Cu is provided as a main component or a component equivalent to the main component into the first internal electrode layer 6A and the second internal electrode layer 6B, the electric characteristics of the three-terminal multilayer ceramic capacitor are improved, the surface electrode layer 9 is stably provided on the surface of the second internal electrode layer 6B, the strength of the internal electrode layer 6 is improved, and the voltage resistance of the multilayer ceramic capacitor is improved.

In addition, the state of the internal electrode layer 6 in the vicinity of the interface with the dielectric layer 5 changes, and the life at high temperature load can be improved.

This makes it possible to prevent dielectric breakdown at the time of voltage application and to obtain a multilayer ceramic capacitor with excellent reliability.

The thicknesses of the first internal electrode layer 6A and the second internal electrode layer 6B in the lamination direction T are preferably, for example, about 0.1 μm or more and about 2.0 μm or less respectively, and particularly preferably about 0.2 μm or more and about 0.4 μm or less respectively.

It is possible to reduce the size of the three-terminal multilayer ceramic capacitor by reducing the thickness thereof while maintaining the electric conductivity and capacitance, and maintaining the dielectric breakdown strength and life at high temperature load.

As for the internal electrode layer 6, the first internal electrode layers 6A and the second internal electrode layers 6B may be alternately provided in the lamination direction T. Furthermore, in a predetermined region of the inner layer portion 7, the first internal electrode layers 6A may be provided consecutively, or the first internal electrode layers 6A and the dielectric layers 5 may be laminated alternately.

By providing the first internal electrode layers consecutively in a predetermined region of the inner layer portion, when the three-terminal multilayer ceramic capacitor is mounted as a bypass capacitor in an electric circuit, it is possible to improve the function by reducing the resistance value of a signal line, a power supply line, or the like.

It is preferable to provide the second internal electrode layer as the lowest layer of the internal electrode layer.

With such a configuration, it is possible to provide the second internal electrode layer including the surface electrode layer at a position closest to the wiring of the mounting board on which the three-terminal multilayer ceramic capacitor is to be mounted, such that it is possible to obtain more remarkable advantageous effects of the present invention.

End Surface External Electrode

The end surface external electrodes 3 include a first end surface external electrode 3A provided on the first end surface C1 of the multilayer body 2, and a second end surface external electrode 3B provided on the second end surface C2 of the multilayer body 2.

The end surface external electrode 3 can be obtained by forming a base electrode layer by coating and firing an external electrode paste on the entirety or substantially the entirety of both end surfaces C of the multilayer body and portions of both main surfaces A and both lateral surfaces B, and forming a plating layer on the base electrode layer.

The first end surface external electrode 3A and the second end surface external electrode 3B are collectively referred to as an end surface external electrode 3 when it is not necessary to distinguish them from each other.

Lateral Surface External Electrode

The lateral surface external electrode 4 includes a first lateral surface external electrode 4A provided on the first lateral surface B1 of the multilayer body 2, and a second lateral surface external electrode 4B provided on the second lateral surface B2 of the multilayer body 2, for example.

In the three-terminal multilayer ceramic capacitor, when the lateral surface external electrode is used as a ground electrode, the capacitor defines and functions by providing either the first lateral surface external electrode 4A or the second lateral surface external electrode 4B. However, the first lateral surface external electrode 4A and the second lateral surface external electrode 4B are preferably provided on both lateral surfaces of the multilayer body to make the impedance small, as in a preferred embodiment of the present invention.

The first lateral surface external electrode 4A and the second lateral surface external electrode 4B are collectively referred to as the lateral surface external electrode 4 when it is not necessary to distinguish them from each other.

The lateral surface external electrode 4 covers a portion of the lateral surface B, and further covers a portion of the main surface A and a portion of the lateral surface B.

The lateral surface external electrode can be obtained by forming a base electrode layer by coating and firing an external electrode paste, and forming a plating layer on the base electrode layer.

The end surface external electrode 3 and the lateral surface external electrode 4 each preferably include a base electrode layer and a plating layer provided on the base electrode layer.

It is preferable that Ni and a dielectric are mixed in the external electrode paste forming the base electrode layer.

The end surface external electrode 3 and the lateral surface external electrode 4 can be formed by using, for example, a co-firing method in which they are simultaneously fired with a multilayer body.

The plating layer provided on the base electrode layer preferably has, for example, a two-layer structure of Ni plating, and Sn plating thereon.

The external electrode paste providing the end surface external electrode 3 and the lateral surface external electrode 4 may include, for example, Cu and Si.

This makes it possible to obtain an external electrode structure with excellent moisture resistance.

The three-terminal multilayer ceramic capacitor 1 may be used for decoupling so that the end surface external electrode 3 is connected in series to a circuit, and the lateral surface external electrode 4 is connected in parallel to the circuit. However, the end surface external electrode may be connected thereto in parallel, and the lateral surface external electrode may be connected thereto in series.

Surface Electrode Layer

The surface electrode layer 9 is a thin film layer provided on the surface of the second internal electrode layer 6B.

As shown in FIG. 2, the multilayer body 2 can be obtained by stacking a plurality of dielectric layers 5a formed by applying an internal electrode paste for forming the first internal electrode layer 6A on the upper surface and a plurality of dielectric layers 5b formed by applying an internal electrode paste for forming the second internal electrode layer 6B on the upper surface between the two outer layer portions 8a and 8b, firing the stacked layers, and then performing a process such as, for example, polishing.

The internal electrode paste for forming the internal electrode layer includes a metal powder defining and functioning as an electric conductor, a binder, an additive such as a plasticizer or a dispersant, an organic solvent, and the like. However, the internal electrode paste forming the second internal electrode layer 6B may be mixed with, any one of the metal components of Sn, In, Ga, Zn, Bi, Pb, Fe, V, Y, and Cu, in addition to the metal component defining and functioning as a main component having the largest blending amount. When the resultant mixture is fired, the surface electrode layer 9 including any one of Sn, In, Ga, Zn, Bi, Pb, Fe, V, Y, and Cu is formed on the surface of the second internal electrode layer 6B so as to cover the second internal electrode layer.

The surface electrode layer may include a metal component defining and functioning as a main component of the second internal electrode layer, and any of the metal components Sn, In, Ga, Zn, Bi, Pb, Fe, V, Y, and Cu may remain in the second internal electrode layer.

From the analysis results of the wavelength dispersive X-ray analysis (WDX), it was confirmed that the surface electrode layer included any component among Sn, In, Ga, Zn, Bi, Pb, Fe, V, Y, and Cu, which was different from the main component of the second internal electrode layer.

The thickness of the surface electrode layer 9 in the lamination direction T is preferably, for example, about 5 nm or more and about 40 nm or less.

If the thickness is smaller than about 5 nm, the second internal electrode layer 6B cannot be reliably covered, and it becomes difficult to obtain high durability.

On the other hand, when the thickness is larger than about 40 nm, adjacent dielectric layers deteriorate.

The surface electrode layer 9 preferably includes, for example, Ni as a main component and at least one selected from Sn, In, Ga, Zn, Bi, Pb, Fe, V, Y, and Cu as a subcomponent in a proportion of about 40 mol or more and about 80 mol or less with respect to 100 mol of the main component.

When the amount is less than about 40 mol, sufficient durability cannot be obtained.

On the other hand, when the amount exceeds about 80 moles, the metal melts and forms beads, and it becomes difficult to obtain a uniform surface electrode layer.

Since the surface electrode layer formed under a predetermined condition can reliably cover the surface of the second internal electrode layer, it is possible to prevent dielectric breakdown, etc. at the time of voltage application, and it is possible to obtain high durability.

Although preferred embodiments of the present invention have been described above, the present invention is not limited thereto, and various modifications are possible.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-terminal multilayer ceramic capacitor comprising:
   a multilayer body including an inner layer portion in which a plurality of dielectric layers and a plurality of internal electrode layers are alternately laminated, and outer layer portions on both sides of the inner layer portion in a lamination direction;
   end surface external electrodes respectively on a first end surface and a second end surface in a length direction intersecting the lamination direction of the multilayer body; and
   at least one lateral surface external electrode on at least one side in a width direction intersecting the lamination direction and the length direction of the multilayer body; wherein
   the plurality of internal electrode layers include:
      first internal electrode layers each penetrating the multilayer body in the length direction and connected to the end surface external electrodes; and
      second internal electrode layers each providing capacitance with the first internal electrode layer and connected to the lateral surface external electrode;
   at least one surface electrode layer is provided on a surface of the second internal electrode layer;
   the at least one surface electrode layer includes at least one of Sn, In, Ga, Zn, Bi, Pb, Fe, V, or Y, which is different from a main component of the second internal electrode layer; and
   the first internal electrode layer does not have a surface electrode layer containing the same components as the second internal electrode layer.

2. The three-terminal multilayer ceramic capacitor according to claim 1, wherein the first internal electrode layers and the second internal electrode layers each include Ni or Cu as a main element.

3. The three-terminal multilayer ceramic capacitor according to claim 1, wherein the first internal electrode layers and the second internal electrode layers each have a thickness in the lamination direction of about 0.1 μm or more and about 2.0 μm or less.

4. The three-terminal multilayer ceramic capacitor according to claim 1, wherein the first internal electrode layers and the second internal electrode layers each have a thickness in the lamination direction of about 0.2 μm or more and about 0.4 μm or less.

5. The three-terminal multilayer ceramic capacitor according to claim 1, wherein the internal electrode layers include the first internal electrode layers and the second internal electrode layers alternately provided.

6. The three-terminal multilayer ceramic capacitor according to claim 1, wherein the internal electrode layers include first internal electrode layers consecutively provided in a predetermined region.

7. The three-terminal multilayer ceramic capacitor according to claim 1, wherein the internal electrode layers include a second internal electrode layer provided as a lowest layer of the internal electrode layers.

8. The three-terminal multilayer ceramic capacitor according to claim 1, wherein the at least one surface electrode layer includes Ni as a main component, and at least one of Sn, In, Ga, Zn, Bi, Pb, Fe, V, or Y as a subcomponent in a proportion of about 40 mol or more and about 80 mol or less with respect to 100 mol of the main component.

9. The three-terminal multilayer ceramic capacitor according to claim 1, wherein the at least one surface electrode layer has a thickness in the lamination direction of about 5 nm or more and about 40 nm or less.

10. The three-terminal multilayer ceramic capacitor according to claim 1, wherein the dielectric layers each include Ba, Ti, at least one of Mg, B or Mo, and at least one of Dy, Ho or Tb.

11. The three-terminal multilayer ceramic capacitor according to claim 1, wherein a thickness of each of the dielectric layers in the lamination direction is about 0.2 μm or more and about 2.0 μm or less.

12. The three-terminal multilayer ceramic capacitor according to claim 1, wherein a thickness of each of the dielectric layers in the lamination direction is about 0.2 μm or more and about 0.4 μm or less.

13. The three-terminal multilayer ceramic capacitor according to claim 1, wherein the end surface external electrodes and the at least one lateral surface external electrode respectively include Ni and a dielectric.

14. The three-terminal multilayer ceramic capacitor according to claim 1, wherein the end surface external electrodes and the at least one lateral surface external electrode respectively include Cu and Si.

15. The three-terminal multilayer ceramic capacitor according to claim 1, wherein the multilayer body has a rectangular or substantially rectangular parallelepiped shape.

16. The three-terminal multilayer ceramic capacitor according to claim 1, wherein each of the outer layer portions is made of a same ceramic material as the dielectric layers.

17. The three-terminal multilayer ceramic capacitor according to claim 1, wherein each of the dielectric layers includes $BaTiO_3$ as a main component.

18. The three-terminal multilayer ceramic capacitor according to claim 1, wherein the end surface external electrodes are respectively provided on an entirety or substantially an entirety of the first and second end surfaces.

19. The three-terminal multilayer ceramic capacitor according to claim 1, wherein the at least one lateral surface external electrode defines a ground electrode.

20. The three-terminal multilayer ceramic capacitor according to claim 1, wherein the at least one lateral surface external electrode includes a first lateral surface external electrode on a first lateral surface of the multilayer body and a second lateral surface external electrode on a second lateral surface of the multilayer body.

* * * * *